Feb. 10, 1931.  E. H. GRIBBLE  1,791,722
COMBINATION VEHICLE TRUNK AND CARRIER
Filed Dec. 23, 1929   2 Sheets-Sheet 1
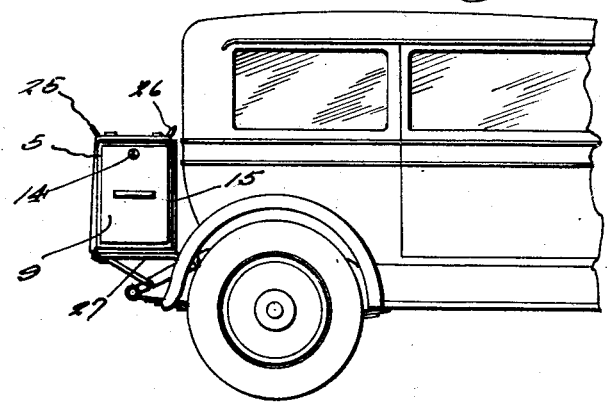
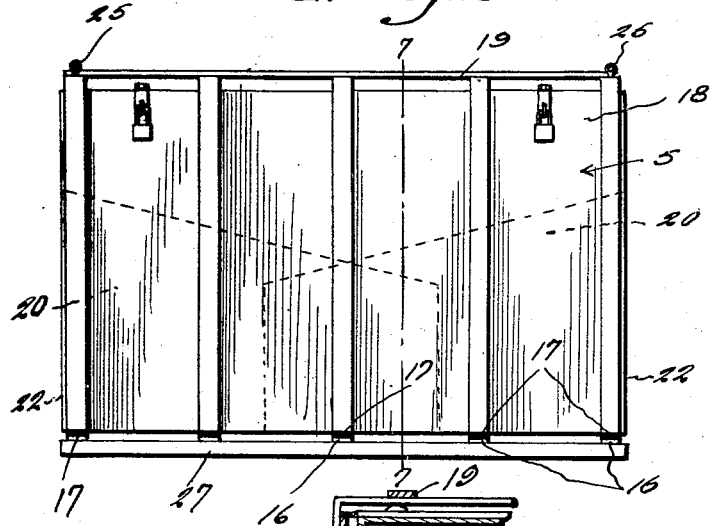
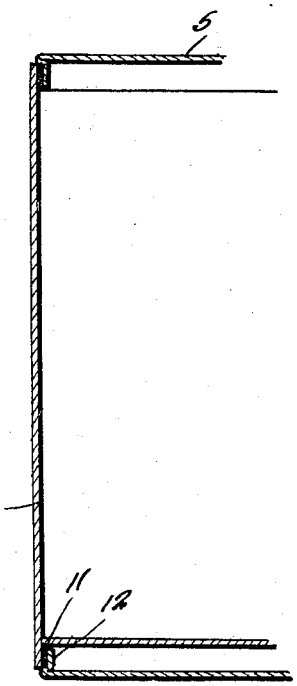
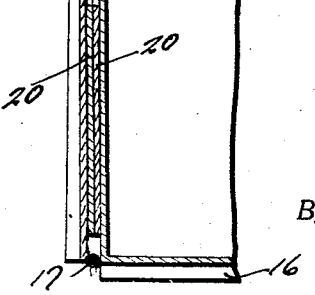
Inventor
*Emmett H. Gribble*
By *Clarence A. O'Brien*
Attorney Feb. 10, 1931.   E. H. GRIBBLE   1,791,722
COMBINATION VEHICLE TRUNK AND CARRIER
Filed Dec. 23, 1929    2 Sheets-Sheet 2
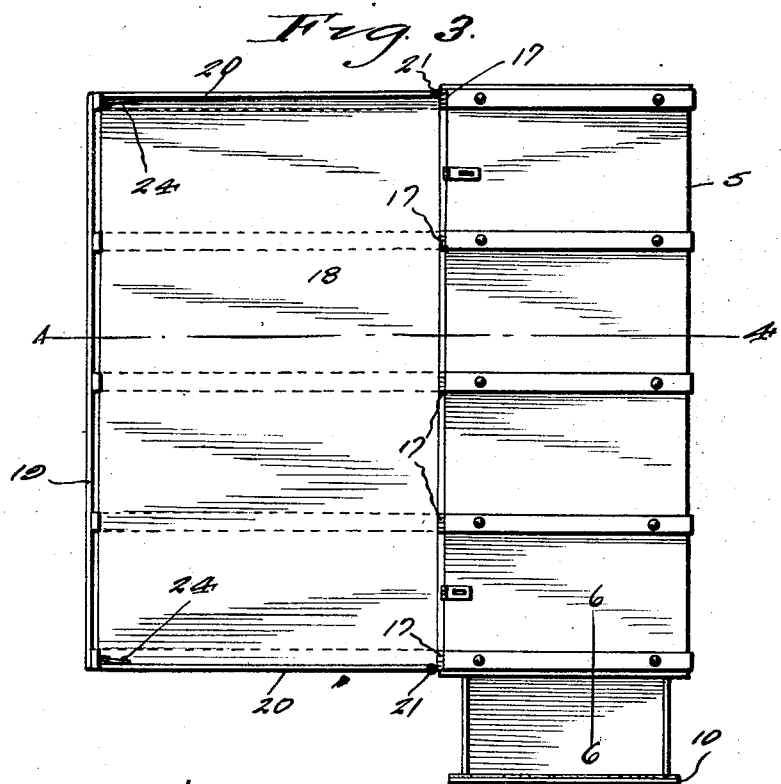
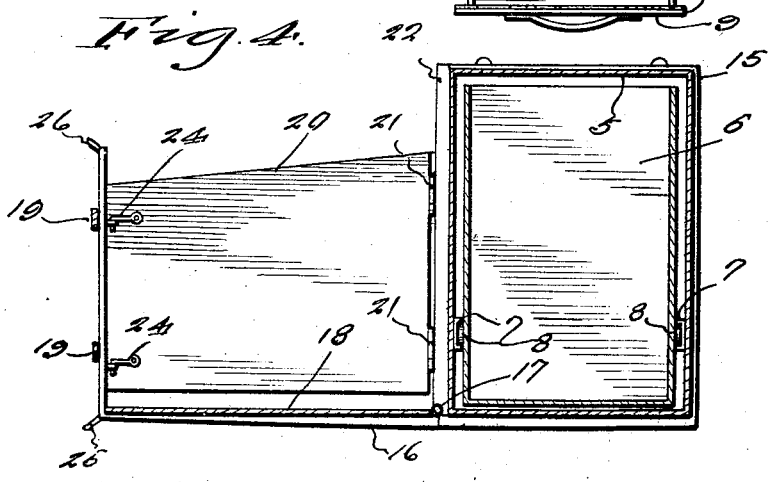
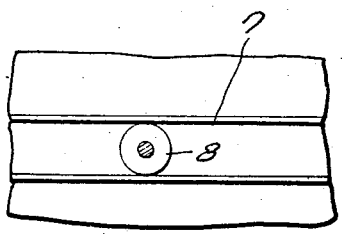
Inventor
Emmett H. Gribble
By Clarence A. O'Brien
Attorney Patented Feb. 10, 1931

1,791,722

UNITED STATES PATENT OFFICE

EMMETT H. GRIBBLE, OF SOUTH SIOUX CITY, NEBRASKA

COMBINATION VEHICLE TRUNK AND CARRIER

Application filed December 23, 1929. Serial No. 416,067.

The present invention relates to a device particularly adapted to be mounted on the rear of an automobile and has for its prime object to provide in combination a trunk and a carrier foldably mounted thereon.

A still further very important object of the invention resides in the provision of a combination structure of this nature, which is simple, inexpensive to manufacture, strong and durable, easy to manipulate, thoroughly efficient and reliable in use, and otherwise well adapted for the purpose for which it is designed.

With the above and numerous other objects in view as will appear as the description proceeds, the invention resides in certain novel features of construction, and in the combination and arrangement of parts as will be hereinafter more fully described and claimed.

In the drawing:

Figure 1 is a fragmentary side elevation showing the rear end of an automobile with my improved device mounted thereon, Figure 2 is a rear elevation of the device folded, Figure 3 is a top plan view of the device with the carrier extended, Figure 4 is a longitudinal sectional view therethrough taken substantially on the line 4—4 of Figure 3, Figure 5 is a detail view showing the track and roller, Figure 6 is an enlarged detail section taken substantially on the line 6—6 of Figure 3 but showing the drawer closed, and Figure 7 is a sectional view taken substantially on the line 7—7 of Figure 2.

Referring to the drawing in detail it will be seen that the numeral 5 denotes a trunk casing which is open at one end or side so that a drawer 6 may slide therein, this drawer being mounted by means of channeled tracks 7 fixed on the inner faces of the front and rear walls of the casing 5 a slight distance above the bottom, said tracks 7 receiving therein rollers 8 journaled on the sides of the drawer 6.

The outer end wall of the drawer 6 is denoted specifically by the numeral 9 and has extensions at the sides thereof denoted by the numeral 10 which extend outwardly beyond the side walls of the drawer so as to abut compressible strips 11 of suitable material on flanges 12 formed at the open end of the casing and extending inwardly thereof and slightly offset inwardly.

These strips 11 make the trunk watertight when the drawer is closed. Any suitable lock structure 14 may be associated with the drawer and casing for locking the drawer in a shut position.

Substantially U-shaped metallic straps 15 are disposed about the front, top and bottom of the casing to strengthen the same and said straps are provided with comparatively thick lower portions as is indicated clearly in Figure 4. L-shaped bars 16 are hingedly connected, as at 17, with the free ends of the lower portions of the straps 15 and have a panel 18 fixed thereto across the legs of the bars 16 with which the hinges are engaged.

Across the other legs of the bars 16 are braces 19. Side wings 20 are hingedly connected as at 21 with the casing at the sides thereof and may be folded or swung inwardly one over the other, the closed side of the casing having a rearward extension as is shown at 22 for this purpose. When the panel 18 is horizontally disposed as is shown in Figures 3 and 4 it will be seen that the wings 20 may be swung outwardly and engaged by hooks and eyes 24 to the upstanding legs of the outermost bars 16.

On the corners of the outermost bars 16 there are provided eyes 25 which are also provided as at 26 on the trunk casing so that rope or the like may be passed therethrough for holding the structure in a folded position at which time it will be noted that the panel 18 is folded up against the folded wings 20 and the outer leg portions of the bars 16 extend over the top of the trunk casing.

This device may be mounted on a suitable supporting stand or platform 27 at the rear of an automobile as clearly illustrated in Figure 1 of the drawings. Of course any type of stand may be used as may be necessary for the particular type of automobile on which the device is to be mounted.

It is thought that the construction, utility, operation and advantages of the invention will now be quite apparent to those skilled in this art without a more detailed description thereof.

The present embodiment of the invention has been described in considerable detail merely for the purposes of exemplification since in actual practice it attains the features of advantage enumerated as desirable in the statement of the invention and the above description.

It will be apparent that changes in the details of construction, in the combination and arrangement of parts may be resorted to without departing from the spirit or scope of the invention or sacrificing any of its advantages.

Having thus described my invention, what I claim as new is:

1. A device of the class described comprising a trunk casing having one end open, a drawer slidable in the trunk casing through the open end, channel tracks mounted inside the casing, rollers journaled on the sides of the drawer to ride in the track, substantially U-shaped straps mounted on the casing having bottom and top legs mounted on the bottom and top surfaces respectively of said casing, L-shaped bars hingedly connected to the terminals of said bottom legs, a panel across the legs of the bars which are hingedly connected to said U-shaped straps.

2. A device of the class described comprising a trunk casing having one end open, a drawer slidable in the trunk casing through the open end, channel tracks mounted inside the casing, rollers journaled on the sides of the drawer to ride in the track, substantially U-shaped straps mounted on the casing having bottom and top legs mounted on the bottom and top surfaces respectively of said casing, L-shaped bars hingedly connected to the terminals of said bottom legs, a panel across the legs of the bars which are hingedly connected to said U-shaped straps, wings hingedly connected to the casing so that they may be extended to form sides for the panel and may be folded over one another against the casing, and means for connecting the panels with the outermost bars when the wings are in extended position.

3. A device of the class described comprising a trunk casing having one end open, a drawer slidable in the trunk casing through the open end, channel tracks mounted inside the casing, rollers journaled on the sides of the drawer to ride in the track, substantially U-shaped straps mounted on the casing having bottom and top legs mounted on the bottom and top surfaces respectively of said casing, L-shaped bars hingedly connected to the terminals of said bottom legs, a panel across the legs of the bars which are hingedly connected to said U-shaped straps, wings hingedly connected to the casing so that they may be extended to form sides for the panel and may be folded over one another against the casing, means for connecting the panels with the outermost bars when the wings are in extended position, and an extension formed on one end of the casing to which one of the wings is hinged so that it may fold flatly over the other wing.

In testimony whereof I affix my signature.

EMMETT H. GRIBBLE.